(12) United States Patent
Kumagai et al.

(10) Patent No.: US 9,354,054 B2
(45) Date of Patent: May 31, 2016

(54) SURVEYING SYSTEM

(71) Applicant: Kabushiki Kaisha TOPCON, Itabashi-ku, Tokyo-to (JP)

(72) Inventors: Kaoru Kumagai, Tokyo-to (JP); Jun-ichi Kodaira, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 137 days.

(21) Appl. No.: 14/243,259

(22) Filed: Apr. 2, 2014

(65) Prior Publication Data

US 2014/0304995 A1    Oct. 16, 2014

(30) Foreign Application Priority Data

Apr. 11, 2013 (JP) .................................. 2013-083260

(51) Int. Cl.
*G01B 15/00* (2006.01)
*G01C 9/06* (2006.01)
(Continued)

(52) U.S. Cl.
CPC *G01C 9/06* (2013.01); *G01C 11/00* (2013.01); *G01C 15/004* (2013.01); *G01C 15/06* (2013.01); *G01C 2009/066* (2013.01)

(58) Field of Classification Search
CPC .... A63C 19/06; E04G 21/1833; G01C 15/00; G01C 9/06; G01C 11/00; G01C 2009/066
USPC .............................. 33/1 G, 267, 290, 292, 293
See application file for complete search history.

(56) References Cited

U.S. PATENT DOCUMENTS

| 5,742,385 A | 4/1998 | Champa |
| 2007/0289152 A1* | 12/2007 | Zeng ...................... G01C 15/06 33/293 |

(Continued)

FOREIGN PATENT DOCUMENTS

| CN | 101040166 A | 9/2007 |
| CN | 102985787 A | 3/2013 |

(Continued)

OTHER PUBLICATIONS

European communication mailed Aug. 12, 2014 in corresponding European patent application No. 14162637.4

(Continued)

*Primary Examiner* — Christopher Fulton
(74) *Attorney, Agent, or Firm* — Nields, Lemack & Frame, LLC

(57) ABSTRACT

The invention provides a surveying system, which comprises an electronic level and staff devices belonging to either one of two or more groups, wherein the staff device has staffs with bar codes corresponding to groups, to which a staff belongs, and mobile station devices installed on the staffs, wherein the mobile station device has a mobile station display unit to display working data and a mobile station communication unit for performing wireless communication to and from the electronic level, wherein the electronic level has an image pickup unit for acquiring images within a range of working, a control device for extracting staff images from the images, for identifying as to which group the bar code pattern of the extracted staff image belongs and for determining three-dimensional position of the staff based on the staff image, and a main communication unit for transmitting the three-dimensional position obtained to the mobile station device, and wherein the mobile station device displays the relation between the three-dimensional position of the staff as received and the working data on the mobile station display unit.

8 Claims, 5 Drawing Sheets

(51) Int. Cl.
*G01C 15/06* (2006.01)
*G01C 15/00* (2006.01)
*G01C 11/00* (2006.01)

(56) References Cited

U.S. PATENT DOCUMENTS

| | | | | |
|---|---|---|---|---|
| 2008/0036646 | A1* | 2/2008 | Green | G01C 15/00 342/118 |
| 2010/0134617 | A1* | 6/2010 | Guertler | G01C 15/00 348/135 |
| 2012/0166137 | A1* | 6/2012 | Grasser | G01C 15/00 702/150 |
| 2012/0182418 | A1* | 7/2012 | Kumagai | G01C 5/00 348/137 |
| 2013/0093882 | A1 | 4/2013 | Kotzur et al. | |
| 2015/0040411 | A1* | 2/2015 | Fujioka | G01C 9/06 33/292 |

FOREIGN PATENT DOCUMENTS

| | | |
|---|---|---|
| EP | 2405236 A1 | 1/2012 |
| EP | 2503284 A2 | 9/2012 |
| JP | 7-229737 A | 8/1995 |
| JP | 3795190 B2 | 7/2006 |
| JP | 2012-145463 A | 8/2012 |

OTHER PUBLICATIONS

Chinese communication dated Nov. 25, 2015 in corresponding Chinese patent application No. 201410144493.6.

* cited by examiner

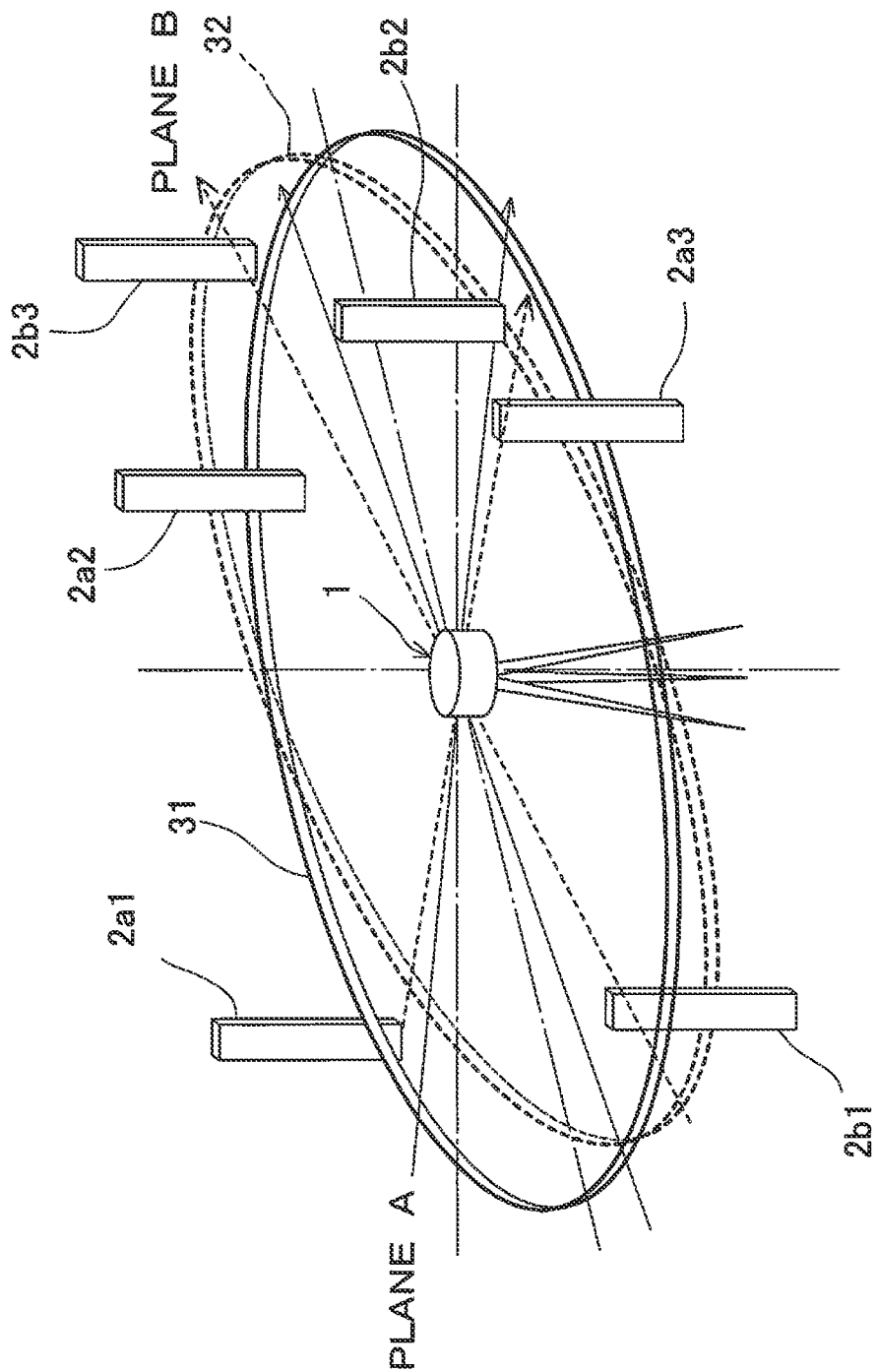

SURVEYING SYSTEM

BACKGROUND OF THE INVENTION

The present invention relates to a surveying system, by which a plurality of reference planes can be set up.

An electronic level becomes widespread as means for height measurement and distance measurement by using staffs, on which predetermined bar codes are engraved.

In a conventional type electronic level, a staff is erected at a predetermined geographical point, and the height measurement and the distance measurement of the geographical point, where the staff is erected, are carried out, and data are collected for the ranges and the geographical points as planned.

Further, when construction work as required such as civil engineering work is carried out based on a working data, it is necessary to have a horizontal reference plane, and as means for forming the horizontal reference plane, there is a laser projecting device, which projects and rotates a laser beam in horizontal direction.

Therefore, conventionally, predetermined data have been collected by an electronic level, and construction work as required has been carried out based on the collected data, the working data, and on the reference plane formed by a laser projecting device.

For this reason, a plurality of devices such as an electronic level, a laser projecting device, etc. has been necessary for each and every operation.

It is to be noted that the Japanese Patent Publication JP-A-H7-229737 and the Japanese Patent Gazette No. 3795190 discloses the fact that each of the staffs are sighted by an electronic level, the code patterns formed on each of the staffs are electronically deciphered, and the sighting height is automatically obtained.

SUMMARY CF THE INVENTION

It is an object of the present invention to provide a surveying system, by which it is possible to collect data and to set up reference planes by using only the electronic level and the staffs with respect to the operation of the operation control panel.

To attain the object as described above, a surveying system according to the present invention comprises an electronic level and staff devices belonging to either one of two or more groups, wherein the staff device has staffs with bar codes corresponding to groups, to which a staff belongs, and mobile station devices installed on the staffs, wherein the mobile station device has a mobile station display unit to display working data and a mobile station communication unit for performing wireless communication to and from the electronic level, wherein the electronic level has an image pickup unit for acquiring images within a range of working, a control device for extracting staff images from the images, for identifying as to which group the bar code pattern of the extracted staff image belongs and for determining three-dimensional position of the staff based on the staff image, and a main communication unit for transmitting the three-dimensional position obtained to the mobile station device, and wherein the mobile station device displays the relation between the three-dimensional position of the staff as received and the working data on the mobile station display unit.

Further, in the surveying system according to the present invention, three-dimensional positions of staffs at two or more geographical points are set by the staff device belonging to each of the groups, and a reference plane is formed for each of the groups respectively.

Further, in the surveying system according to the present invention, the image pickup unit acquires an image so that an object of working is included therein, the mobile station display unit displays by classifying as to which of the two or more groups the object of working belongs, and displays survey setting points to be set with respect to the object of working, wherein the electronic level measures the three-dimensional position of a staff for each of the groups with respect to the staff device, transmits the three-dimensional position to the corresponding mobile station device, and displays the relation between the staff and the survey setting point.

Further, in the surveying system according to the present invention, the staff device has a mobile station tilt sensor for detecting the tilting of the staffs, and corrects the results of distance measurement and the horizontal angle with respect to the staffs based on the detection results of the mobile station tilt sensor.

Further, in the surveying system according to the present invention, the electronic level has a rotary driving unit and is able to rotate in horizontal direction by the rotary driving unit, wherein the image pickup unit acquires a frame image at every predetermined time, or acquires the frame images continuously, wherein the control device extracts a staff image for each frame image respectively, and rotates the electronic level by controlling the rotary driving unit so that the extracted image does not deviate from the frame image, and so as to follow the staffs.

Further, in the surveying system according to the present invention, the image pickup unit is a total circumferential camera, and a total circumferential image is acquired by the image pickup unit.

According to the present invention, the surveying system comprises an electronic level and staff devices belonging to either one of two or more groups, wherein the staff device has staffs with bar codes corresponding to groups, to which a staff belongs, and mobile station devices installed on the staffs, wherein the mobile station device has a mobile station display unit to display working data and a mobile station communication unit for performing wireless communication to and from said electronic level, wherein the electronic level has an image pickup unit for acquiring images within a range of working, a control device for extracting staff images from the images, for identifying as to which group the bar code pattern of the extracted staff image belongs and for determining three-dimensional position of the staff based on said staff image, and a main communication unit for transmitting the three-dimensional position obtained to the mobile station device, and wherein the mobile station device displays the relation between the three-dimensional position of the staff as received and the working data on the mobile station display unit. As a result, since relation between the present positions of staffs and the working data can be judged three-dimensionally, the setting of the reference planes and the setting of the survey setting points can be easily carried out.

Further, according to the present invention, in the surveying system, three-dimensional positions of staffs at two or more geographical points are set by the staff device belonging to each of the groups, and a reference plane is formed for each of the groups respectively. As a result, a plurality of reference planes can be set up by the staffs.

Further, according to the present invention, in the surveying system, the image pickup unit acquires an image so that an object of working is included therein, the mobile station display unit displays by classifying as to which of the two or more groups the object of working belongs, and displays survey setting points to be set with respect to the object of working, wherein the electronic level measures the three-dimensional position of a staff for each of the groups with respect to the staff device, transmits the three-dimensional position to the corresponding mobile station device, and displays the relation between the staff and the survey setting point. As a result, the survey setting points can be set up on a plurality of objects of working simultaneously by the staffs where a plurality of different bar codes are marked.

Further, according to the present invention, in the surveying system, the staff device has a mobile station tilt sensor for detecting the tilting of the staffs, and corrects the results of distance measurement and the horizontal angle with respect to the staffs based on the detection results of the mobile station tilt sensor. As a result, measurement results can be obtained with high accuracy, and the measurement of the horizontal angle can be carried out.

Further, according to the present invention, in the surveying system, the electronic level has a rotary driving unit and is able to rotate in horizontal direction by the rotary driving unit, wherein the image pickup unit acquires a frame image at every predetermined time, or acquires the frame images continuously, wherein the control device extracts a staff image for each frame image respectively, and rotates the electronic level by controlling the rotary driving unit so that the extracted image does not deviate from the frame image, and so as to follow the staffs. As a result, there is no need to perform sighting on the staffs for each survey setting point, and this contributes to extensive improvement of efficiency in the survey setting operation.

Furthermore, according to the present invention, in the surveying system, the image pickup unit is a total circumferential camera, and a total circumferential image is acquired by the image pickup unit. As a result, a rotary mechanism unit is omitted, and the measuring operation and the survey setting operation can be carried out over a wide range.

BRIEF DESCRIPTION OF THE DRAWINGS

FIG. 4 is an explanatory drawing of an embodiment in a case where a reference plane is formed by the surveying system.

DETAILED DESCRIPTION OF THE PREFERRED EMBODIMENT

Description will be given below on an embodiment of the present invention by referring to the attached drawings.

Figure 1:
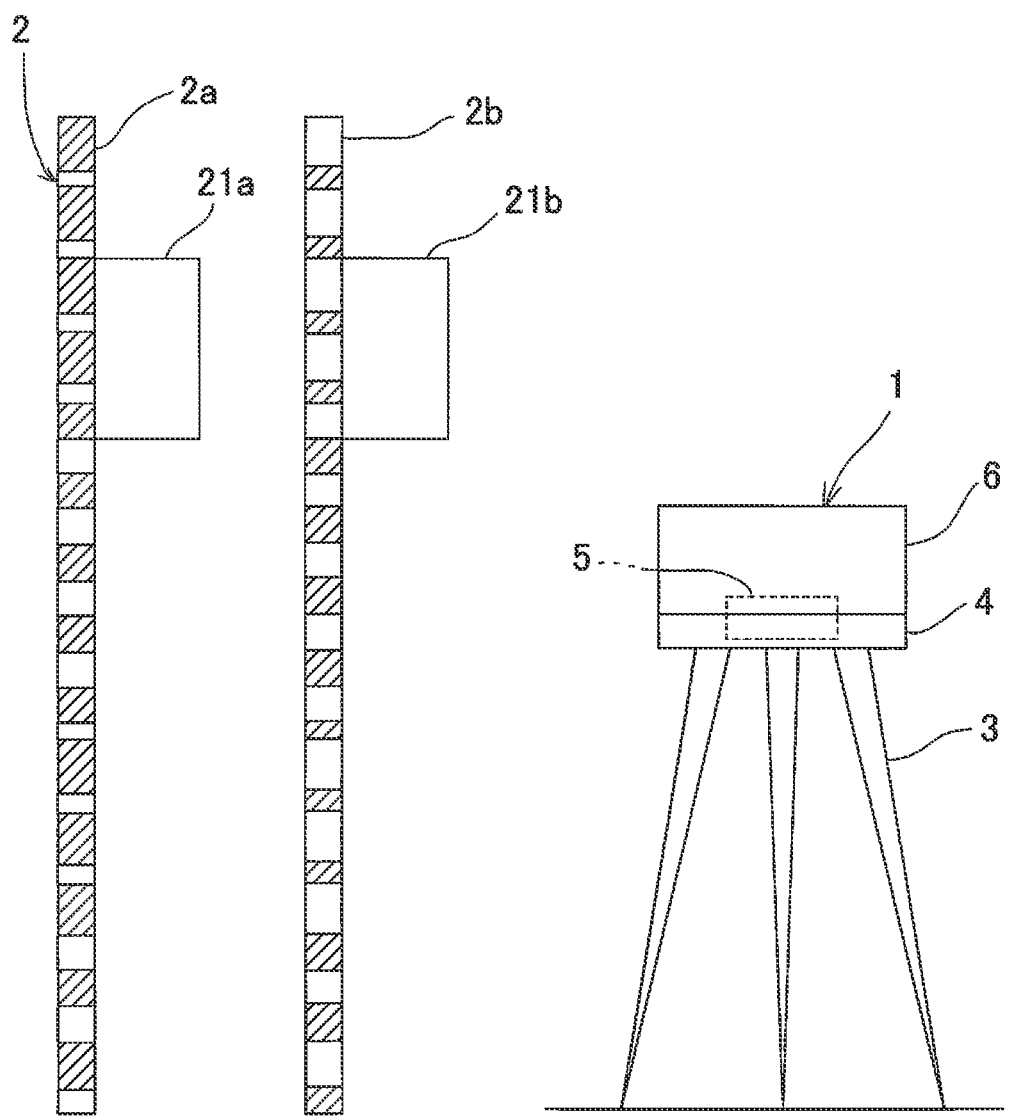
FIG. 1 is a schematical block diagram to show a surveying system according to an embodiment of the present invention.

FIG. 1 shows an approximate arrangement of a surveying system according to an embodiment of the present invention. In FIG. 1, reference numeral 1 denotes an electronic level, reference numeral 2a denotes a staff which belongs to group A, and reference numeral 2b denotes a staff which belongs to group B.

The electronic level 1 is set at a position (hereinafter referred as "reference position") where the entire area of the working target range can be measured. The staffs 2a and 2b are sequentially erected at a plurality of measuring points within the working target range, and the height the distance and the direction (three-dimensional position) are measured by the electronic level 1.

On the staffs 2a and 2b, bar codes are engraved, each of which has a known width and a known height respectively, and height position can be measured by the bar codes. Further, the staff 2a belonging to the group A, and a staff 2b belonging to the group B have bar codes of different pattern, and by distinguishing the patterns of the bar codes, it is possible to distinguish as to which group the staff belongs. On the staffs 2a and 2b, mobile station devices 21a and 21b are installed respectively. It is to be noted that in a case where there is no need to discriminate between the staffs 2a and 2b and between the mobile station devices 21a and 21b, explanation will be given below merely as a staff 2 and a mobile station device 21.

Figure 2:
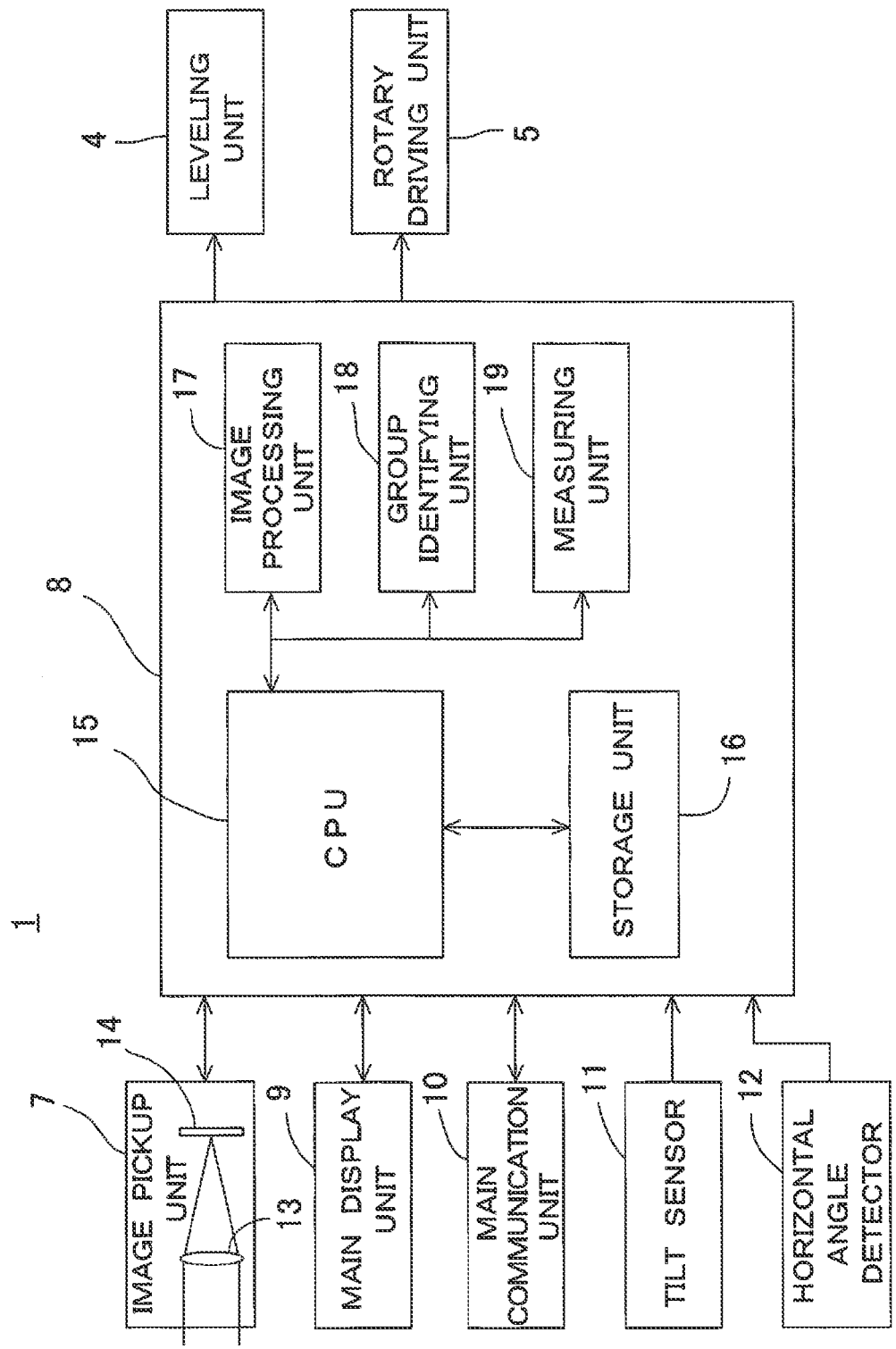
FIG. 2 is a schematical block diagram of an electronic level in the surveying system.

First, by referring to FIG. 1 and FIG. 2, description will be given on general features of the electronic level 1.

A tripod 3 is installed at a reference position, and an electronic level main unit 6 is installed on the tripod 3 via a leveling unit 4 and a rotary driving unit 5. The leveling unit 4 carries out leveling of the electronic level main unit 6 in a horizontal condition.

The rotary driving unit 5 rotates the electronic level main unit 6 around the vertical center axis. Further, the rotary driving unit 5 has a horizontal angle detector 12 such as an encoder, a rotation angle when the electronic level main unit 6 is rotated around the vertical center axis is detected by the horizontal angle detector 12, and the detection result is outputted to a control device 8.

The electronic level main unit 6 primarily comprises an image pickup unit 7, the control device 8, a main display unit 9, a main communication unit 10, a tilt sensor 11, etc. It is to be noted that as the tilt sensor 11, a sensor such as a MEMS (micro electro-mechanical system) is included.

The image pickup unit 7 has an optical system 13 and a two-dimensional image pickup element (area sensor) 14, etc., and the optical system 13 can form an image including the working target range on the two-dimensional image pickup element 14. Further, the two-dimensional image pickup element 14 is an assembly of pixels, and CCD or CMOS sensors, etc., are used, for instance. A rectangular coordinate system is set on the two-dimensional image pickup element 14, and when the electronic level main unit 6 level horizontally, it is so arranged that a horizontal 0 level detected by the electronic level main unit 6 coincides with a coordinate axis which is one of the rectangular coordinate system.

For each of the pixels, which constitute the two-dimensional image pickup element 14, the position of the pixel on the two-dimensional image pickup element 14 is designed to be specified on the rectangular coordinate system, and the coordinates on the rectangular coordinate system is designed to be specified by signals from each pixel. The image acquired by the two-dimensional image pickup element 14 is inputted to the control device 8 as frame image data, and is further stored in a storage unit 16.

The control unit 8 primarily comprises an arithmetic processing unit (CPU) 15, the storage unit 16, an image processing unit 17, a group identifying unit 18, and a measuring unit 19. The arithmetic processing unit 15 fulfills the function to control input/output of data to the storage unit 16, to control image processing in the image processing unit 17, to control signal processing in the group identifying unit 18, and to control arithmetic processing of distance measurement, elevation angle, and horizontal angle in the measuring unit 19.

Further, the control device 8 controls the leveling unit 4, the rotary driving unit 5, and the main communication unit 10 at the timing as required and to the status as required.

The image processing unit 17 extracts an image of staffs 2 from the frame image data. The group identifying unit 18 identifies a pattern of a bar code from the image of each of the staffs 2 extracted and further identifies as to which group the staff 2 belongs. Based on the images of the staffs 2 thus extracted, the measuring unit 19 measures the distance, measures the elevation angle (sighting height), and measures the horizontal angle. Further, by measuring the distance, measuring the elevation angle (sighting height), and measuring the horizontal angle, three-dimensional position of the staffs 2 can be measured.

Distance measurement are carried out by recognizing the size of the staffs 2 in the image. Elevation angle can be measured by reading the pattern of the bar code from the image and by judging as to which position of the bar code the horizontal 0 level is.

It is to be noted that, based on the images staffs 2, the extracting of the pattern of bar codes, the recognizing, judging, distance measurement, and the measurement of sighting height of the pattern are disclosed in the Japanese Patent Publication JP-A-2012-145463.

Further, the horizontal angle can be obtained by the position of the bar code of each of the staffs 2 in the frame image, i.e. by the position on the two-dimensional image pickup element 14.

The storage unit 16 has a program storage area and a data storage area. Various types of programs necessary for measurement and construction work are stored in the program storage area. These programs include, for instance: an image processing program for carrying out image processing at the image processing unit 17, an identification program for recognizing the pattern of a bar code at the group identifying unit 18 in order to identify as to which group a staff belongs, a measurement and calculation program for measuring the distance, measuring the elevation angle, and carrying out the measurement of the horizontal angle, a data input/output control program, a communication program, a display program for controlling a display of the main display unit 9, and a leveling program for executing the leveling, and other programs.

Also, frame image data, the results of identification of the staffs 2, and the measurement results, and working data necessary for the working are stored in the data storage area.

On the main display unit 9, images acquired by the image pickup unit 7 are displayed, or the result of measurement of the staffs 2 or result of group identification of the staffs 2 are displayed. As the method to display the result of group identification, there is a method to display the staffs 2 by color coding, or a method to display the staffs 2 selectively for each group, etc.

The main communication unit 10 can perform wireless communication to and from the mobile station device 21, the main communication unit 10 transmits data such as the measurement result, the result of group identification, and working data to the mobile station devices 21*a* and 21*b* of the staffs 2*a* and 2*b*, and receives the data transmitted from the mobile station devices 21*a* and 21*b*.

The tilt sensor 11 detects the tilting of the electronic level main unit 6, and the detection result is inputted to the control device 8. Based on the detection result inputted, the arithmetic processing unit 15 drives and controls the leveling unit 4, and adjusts (levels) the electronic level main unit 6 in horizontal direction.

Next, description will be given on the staffs 2*a* and 2*b*. It is to be noted that, since the staff 2*a* and the staff 2*b* have basically the same structure, description will be given below by simply referring as the staff 2 when the staffs 2*a* and 2*b* are not discriminated.

Further, in the present embodiment, the mobile station device 21 is integrated with the staffs 2, and a staff device is made up by the staffs 2 and the mobile station device 21.

Figure 3A:
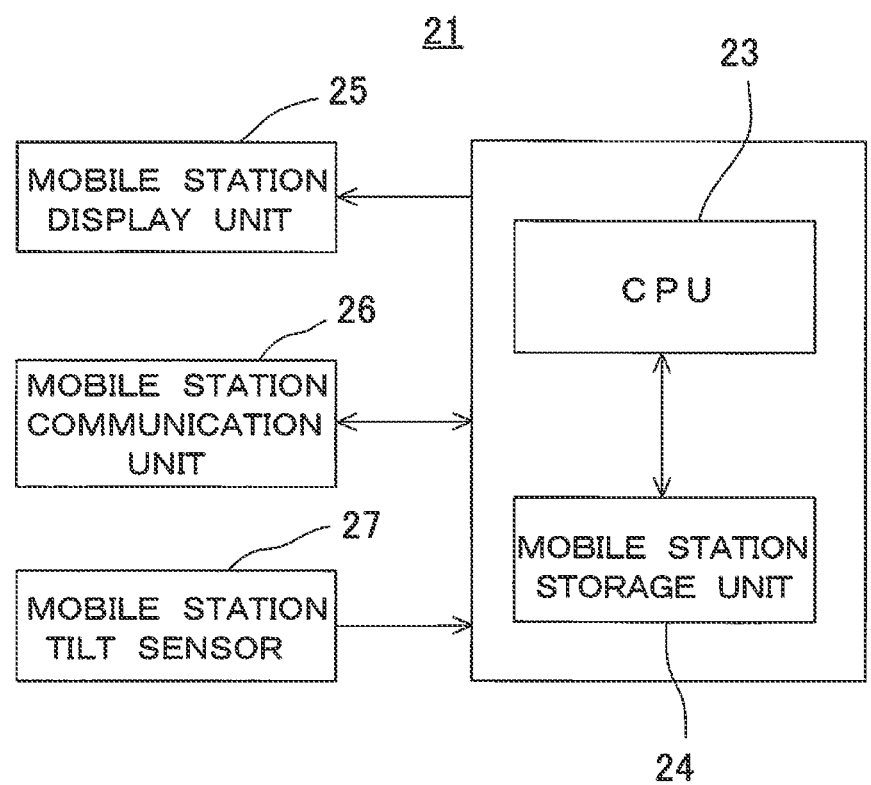
FIG. 3A is a schematical block diagram of a mobile station device of a staff unit in the surveying system.

By referring to FIG. 3, description will be given on the mobile station device 21.

The mobile station device 21 primarily comprises a CPU 23, a mobile station storage unit 24, a mobile station display unit 25, a mobile station communication unit 26, and a mobile station tilt sensor 27.

In the mobile station storage unit 24, various types of programs such as a program necessary for controlling the input/output of data, a program necessary for the display operation, a program for controlling the transmitting and receiving, and other programs are stored, and data such as working data and various measurement data, etc., as transmitted from the electronic level 1 are stored.

The CPU 23 controls input/output of the data to and from the mobile station storage unit 24 by applying the programs as described above, controls display operation of the mobile station display unit 25, and controls transmitting and receiving of the mobile station communication unit 26.

By referring to FIG. 4, description will be given below on an operation of the present embodiment.

In the embodiment as described below, description will be given on a case where two reference planes tilted at different tilt angles are formed. As a preparation for forming the reference plane, working data are inputted to the mobile station device 21. The method of inputting should be adequately selected: to input the working data directly to the mobile station device 21 or to input by transmitting the working data from the control device 8 to the mobile station device 21.

It is supposed here that the optical system 13 has a field angle as required, e.g. an angle of 100°, and supposed that the image pickup unit 7 is rotated at a step of 90°, images are taken in four directions, the images adjacent to each other are overlapped by an angle of 10° each, and that the image in each direction is acquired. The images thus acquired are stored in the storage unit 16. The image processing unit 17 prepares a total circumferential panoramic image by the images adjacent to each other.

It is to be noted that a total circumferential camera may be used as the image pickup unit 7 for acquiring the total circumferential image.

The staffs 2 are installed in the working range. The staffs 2 have two types (A and B) of bar code patterns. It is supposed that staffs 2 having a bar code pattern of A are regarded as belonging to group A, and the staffs 2 belonging to group A are regarded as 2*a*1, 2*a*2, and 2*a*3. Further, the staffs 2 having a bar code pattern of B are regarded as belonging to group B, and the staffs 2 belonging to group B are regarded as staffs 2*b*1, 2*b*2, and 2*b*3. Further, each of the bar code patterns has a reference position of each staff.

The electronic level 1 is installed at a predetermined position, and leveling is performed by the leveling unit 4 so that the electronic level 1 is positioned in the horizontal direction. A point, which serves as a reference for the measurement of the electronic level 1 (e.g. a machine center; hereinafter referred as a "reference point") at the position where the electronic level 1 is installed, is set so as to exist in "A" reference plane 31 and "B" reference plane 32. Further, the reference point is set based on the working data, and considered as known.

First, description will be given on a case where the "A" reference p-Lane 31 is formed.

Each of the staffs 2a1, 2a2, and 2a3, belonging to group A, is set at predetermined positions within the range of the "A" reference plane 31, e.g. at installation positions Pa1, Pa2 and Pa3. Further, each of the staffs 2b1, 2b2 and 2b3, belonging to group B, is set at predetermined positions within the range of the "B" reference plane 32, e.g. at installation positions Pb1, Pb2 and Pb3.

Next, the image processing unit 17 extracts staff images of the staffs 2a1, 2a2 and 2a3 and the staffs 2b1, 2b2 and 2b3 from the frame images or the panoramic image. Based on the bar code pattern of the staff images, the staff images of the staffs 2a1, 2a2 and 2a3 are identified from the staff images based on the bar code pattern of the staff images, by the group identifying unit 18.

Based on the bar code pattern of the staff images, the measuring unit 19 determines a sighting height (deviation from the 0 level) and an elevation angle. Further, based on a sighting direction angle detected by the horizontal angle detector 12, and based on the position of the staff images on the two-dimensional image pickup element 14 (i.e. deviation in horizontal direction with respect to the origin of coordinate system), the measuring unit 19 determines a horizontal angle. Further, from the size of the staff image, the measuring unit 19 determines (measures) a distance from reference point of the electronic level 1 to the staff 2 by calculation. It is to be noted that the determination of the sighting height, the elevation angle, the horizontal angle and the distance is described in the Japanese Patent Publication JP-A-2012-145463.

Further, in a case where the staff 2 is tilted, influence will be exerted on distance measurement and measurement of the horizontal angle, but the results of the horizontal angle and distance measurement as determined by the tilt angle detected by the mobile station tilt sensor 27 can be corrected because the tilt angle of the staff 2 is measured by the mobile station tilt sensor 27. Further, the correction of the measurement results based on the tilt angle is transmitted to the electronic level 1 from the mobile station device 21. The measurement result corrected at the electronic level 1 may be transmitted to the mobile station device 21, or the measurement results may be transmitted to the mobile station device 21, and the measurement result may be corrected at the mobile station device 21 based on the detection result of the mobile station tilt sensor 27.

Based on the horizontal angle and the distance as measured, the position of the staff 2, which is an object of the measurement, is specified. For instance, installation position Pa1 of the staff 2a is specified. Sighting height of the "A" reference plane 31 at the installation position Pa1 is obtained by calculation at the arithmetic processing unit 15 according to the working data.

The sighting height and the installation position Pa1 thus determined are transmitted from the main communication unit 10, and are received at the mobile station communication unit 26. The sighting height thus received is displayed on the mobile station display unit 25 via the CPU 23. Further, based on the working data stored in the mobile station storage unit 24 and based on the installation position Pa1 received, the CPU 23 calculates the height of the "A" reference plane 31 in the working data with respect to the installation position Pa1.

The sighting height measured by the electronic level 1 and the working height calculated at the mobile station device 21 are displayed on the mobile station display unit 25. The sighting height and the working height may be displayed in numerical value. Or, an up-down direction and a deviation between sighting height and working height may be displayed.

In a case where the sighting height and the working height are displayed in numerical values, it is possible to know in which direction, in upward or downward direction and at which position the working height is, with respect to the staff 2a installed.

Figure 3B:
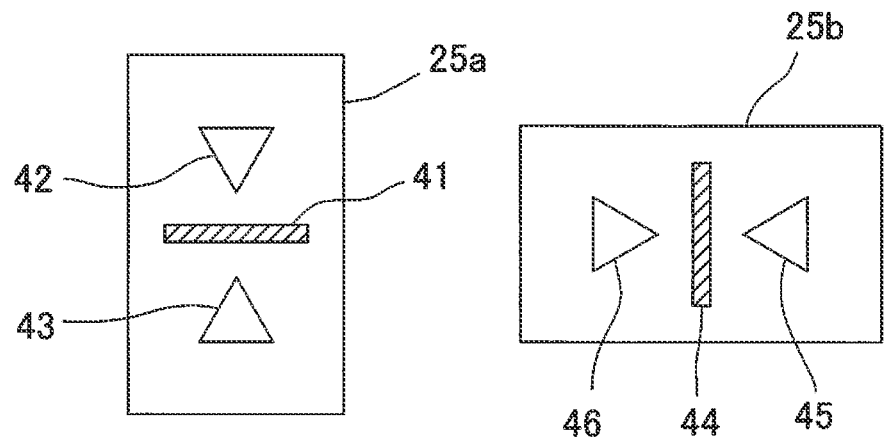
FIG. 3B is a diagram to show an example of a display unit of the mobile station device.

Further, the mobile station display unit 25 may be configured as shown in FIG. 3B.

That is, the mobile station display unit 25 has guidance display units 25a and 25b. The guidance display unit 25a gives guidance display with respect to the height direction, and the guidance display unit 25b gives guidance display with respect to the horizontal direction.

For instance, the guidance display unit 25a has a coincidence line 41 which turns on (or turns on and off) when the sighting height and the working height coincide with each other, and has direction indicating marks 42 and 43, which turn on (or turn on and off) when the sighting height is deviated in upward or downward direction with respect to the working height. Further, in a case where the sighting height is higher than the working height, the direction indicating mark 42 turns on, and in a case where the sighting height is lower than the working height, the direction indicating mark 43 turns on.

Similarly, as for the staffs 2b and 2c, the installation positions Pa2 and Pa3 are specified sequentially, the sighting height and the working height are obtained, and results obtained are displayed respectively on the mobile station display unit 25 of the mobile station devices 21b and 21c.

In a case where the "A" reference plane 31 is a flat surface, the "A" reference plane 31 is determined if three points on the flat surface of the "A" reference plane 31 are determined. Further, the height of the "A" reference plane 31 at an arbitrary position can be determined by measuring the position and the sighting height of the staff 2 installed by the electronic level 1, by transmitting the measured position to the mobile station device 21, and by determining the height of the "A" reference plane 31 determined from the working data and by comparing with the sighting height.

In a case where the tilting direction of the "A" reference plane 31 is already known, it is also possible to set the reference plane according to two installation positions Pa1 and Pa2.

Next, description will be given on a case where the "B" reference plane 32 is formed.

In order to form the "B" reference plane 32, the staff images are extracted, and staff images of the staffs 2b1, 2b2 and 2b3 are identified as group B out of the staff images based on the bar code patterns of the staff images by the group identifying unit 18.

Installation positions Pb1, Pb2 and Pb3 of the staffs 2b1, 2b2 and 2b3 belonging to group B are measured by the electronic level 1, and the sighting height of each of the staffs 2b1, 2b2 and 2b3 is measured.

By measuring the sighting height of each of the installation positions Pb1, Pb2 and Pb3 and each of the staffs 2b1, 2b2 and 2b3, the "B" reference plane 32 is set, similar to the setting of the "A" reference plane 31 as described above.

That is, by using the staffs 2a1, 2a2 and 2a3 of group A and by using the staffs 2b1, 2b2 and 2b3 of group B, two reference planes can be formed. Further, three or more staff groups are formed by three or more different bar code patterns, and by using the staff groups, three or more different reference planes can be formed.

By the rotary driving unit 5, the electronic level main unit 6 is rotated at a predetermined rotation speed. Total circumferential panoramic images is prepared by the frame images thus obtained, and the total circumferential panoramic image is sequentially updated. Further, by extracting the staff images and performing group identification from the updated total circumferential panoramic image and by measuring distance, measuring the elevation angle and measuring the sighting height based on the staff images, the reference plane can be formed or the reference plane can be detected even when the staffs 2 are moved.

Further, in a case where the range of working is within the range of field angle of the optical system of the image pickup unit 7, there is no need to rotate the electronic level main unit 6, and it would suffice to acquire the images in the same direction. Further, if the field angle of the optical system is set to a wide angle so as to correspond with a wide range of working, the rotary driving unit 5 can be omitted.

Furthermore, if the number of the staffs 2 belonging to the same group is set to four or more, or if the number of geographical points where the reference planes are detected by the staffs 2 is set to four or more, it is possible to set up a curved reference plane.

Also, if the results measured at the electronic level 1 are automatically transmitted to the mobile station device 21, an operator on the side of the electronic level 1 is unnecessary.

It is to be noted that, in the description as given above, the reference plane is set by using three or more staffs having the same bar code pattern, while it may be so arranged that one staff is used in one group and the staffs are moved to be set at three or more different points, and to set the height of the reference planes respectively.

Next, by referring to FIG. 5, description will be given on a case where the survey setting points are set up three-dimensionally.

Figure 5:
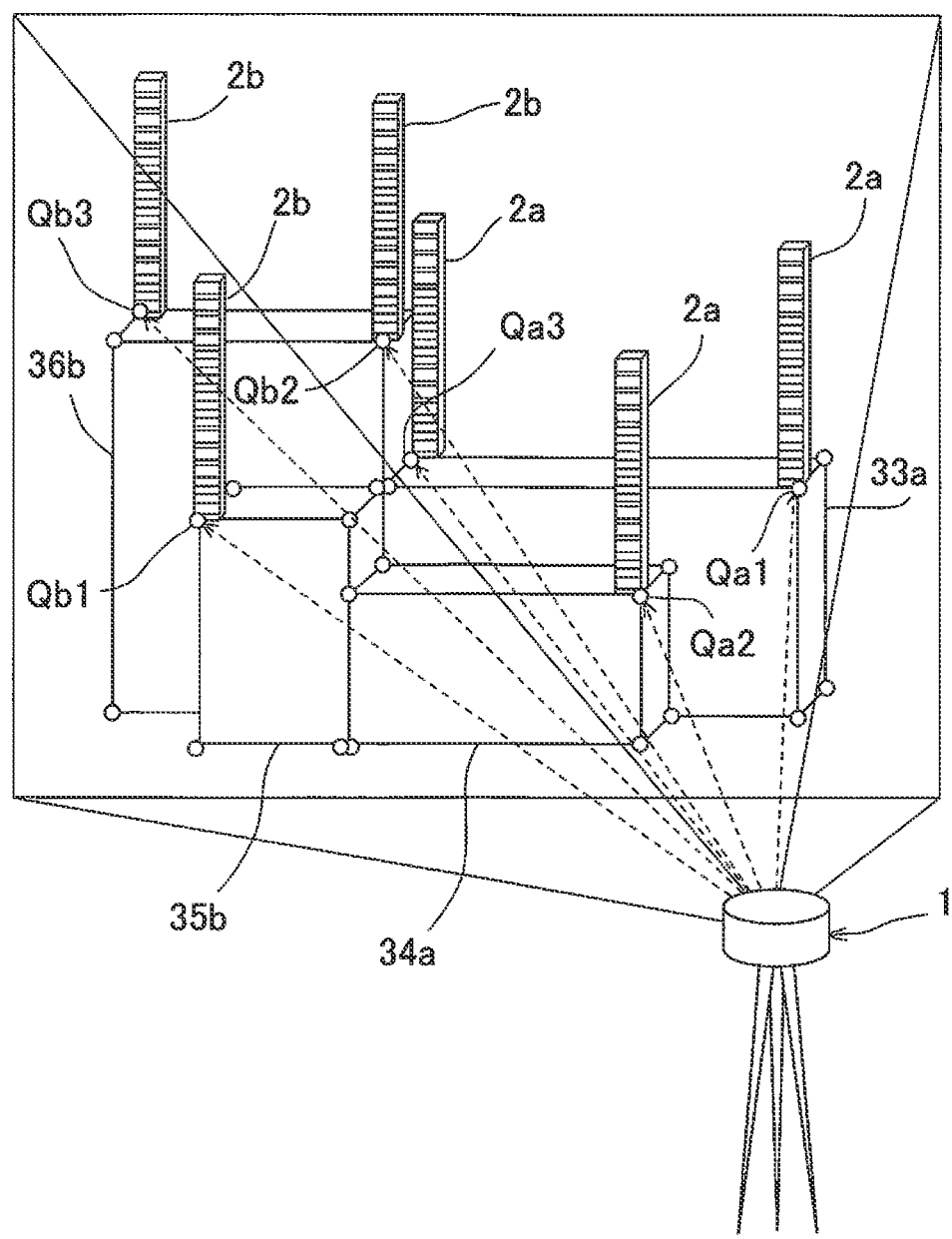
FIG. 5 is an explanatory drawing of an embodiment in a case where a survey setting point is set by the surveying system.

The example shown in FIG. 5 is a case where the range of working is within the range of the field angle of the optical system.

It is supposed that objects of working to be included in group A are objects of working 33*a* and 34*a*, and that the objects of working to be included in group B are objects of working 35*b* and 36*b*. Also, it is supposed that the staff to be used with respect to the objects of working 33*a* and 34*a* is staff 2*a*, and the staff to be used with respect to the objects of working 35*b* and 36*b* is staff 2*b*.

When the operation starts, the image pickup unit 7 acquires images within the range of working at a predetermined time interval, and the acquired images are sequentially stored in the mobile station storage unit 24 as frame image data.

The image processing unit 17 extracts staff images from the frame images, identifies the staff images thus extracted as to whether the staff images thus extracted are related to the staff 2*a* or related to the staff 2*b*.

At the mobile station storage unit 24 of the mobile station devices 21*a* and 21*b*, working data and image data of the objects of working are stored respectively.

First, with respect to the objects of working 33*a* and 34*a* included in group A, description will be given on a case where the survey setting point is set.

In a case where a survey setting point Qa1 of the object of working 33*a* is to be set, the objects of working 33*a* and 34*a* are displayed on the mobile station display unit 25 of the mobile station device 21 of the staff 2*a*, and a survey setting point Qa1 is displayed. The display of the survey setting point includes a display mode to display all of the survey setting points at the same time, next, a display mode to show only the survey setting points to be set, and a display mode first to display all of the survey setting points are displayed at the same time and next to display by color coding or by turning on and off, etc. as for the survey setting points to be set, and display modes can be adequately selected.

Further, the display of the survey setting points is displayed by point and by overlapping the object of working 33*a* and 34*a* so that the survey setting points can be easily judged from the visual sense, and further by selecting, three-dimensional coordinates of the survey setting point can be displayed at the same time.

The electronic level 1 acquires the image, extracts the staff image from the image, selects the staff image of the staff 2*a*, determines based on the staff image thus selected, a distance, an elevation angle, and a sighting height. The electronic level 1 determines the three-dimensional position of the staff 2*a* at the present moment, and transmits the measurement result to the mobile station device 21.

In the mobile station device 21, the measurement results thus received are displayed on the mobile station display unit 25. As for the mode of display of the measurement results, a position is displayed by paint in the image of the object of working so that it is possible to visually confirm the present geographical point with respect to the survey setting point to be set.

Or, as shown in FIG. 3B, with respect to the guidance display unit 25*a* in an up-down direction, a guidance is made on the moving direction by using the direction indicating marks 42 and 43. In the guidance indicating unit 25*b* in a horizontal direction, a guidance is made on the moving direction by using the direction indicating marks 45 and 46. In a case where the up-down position and the horizontal position of the staff 2*a* coincide with the survey setting point Qa1, the coincidence line 41 and the coincidence line 44 are turned on and off respectively.

Or, the deviation value between the actually measured three-dimensional coordinates of the staff 2*a* and the working data of the survey setting point Qa1 is displayed by deviation numerical value. In a case where the staff 2*a* coincides with the survey setting point Qa1, 0 display is carried out, and the like. Therefore, the operator can understand in which direction and how far the moving should be made to set the staff at the survey setting point Qa1.

The image processing unit 17 extracts the staff image of the staff 2*a* from the newest frame image, and the measuring unit 19 measures the newest position of the staff 2*a*, and transmits the measurement result to the mobile station device 21. The operator can understand the newest position in the moving from the display of the mobile station display unit 25, for instance, the guidance display unit 25*a* and 25*b*, and can set the staff 2*a* at the survey setting point Qa1 without waste.

When the survey setting point Qa1 is set by the staff 2*a*, the survey setting point Qa2 to be set up next is displayed on the mobile station display unit 25. It is to be noted that as for the survey setting point Qa1, for which the setting has been completed, color may be changed and the survey setting point Qa1 is left as point display in order to prevent erroneous setting.

By the survey setting point Qa2 thus displayed and the present position as displayed, the operator can visually judge which direction and how much moving should be made, and the moving can be made efficiently and without waste when setting the next survey setting point Qa2. The setting of the survey setting point Qa2 is carried out in a manner similar to the survey setting point Qa1. Further, setting can be made one after another in a similar manner for survey setting points Qa3, Qa4, . . . .

Next, in a case where the survey setting points are set up for the objects of working 35b and 36b of group B, the setting is performed in a similar manner as the setting of the survey setting point for the objects of working 33a and 34a of group A.

Here, in a case where the survey setting point of the objects of working 35b and 36b are set, the staff 2b is used at the mobile station device 21. However, the staff 2b has a bar code pattern different from that of the staff 2a, and the electronic level 1 can identify the difference between the two by the bar code pattern.

Therefore, the measurement of the staff 2b can be performed in parallel to the measurement of the staff 2a. The electronic level 1 transmits the measurement result of the staff 2b to the mobile station device 21b of the staff 2b, and the setting of the survey setting point of the objects of working 35b and 36b of group B can be performed simultaneously as the setting up of the survey setting points of the objects of working 33a and 34a of group A since the measurement result is displayed on the mobile station device 21b.

By using the staffs having three or more different bar code patterns, it is possible to set up the survey setting points at the same time for the objects of working, which belong to three or more groups. Therefore, this contributes to extensive improvement of working efficiency of the survey setting point.

Next, description will be given below on a case where tracking is made on the staff by image processing when the field angle of the optical system 13 is not a wide angle, and the survey setting points are set up sequentially. In this case, the electronic level main unit 6 is rotated by the rotary driving unit 5, and the horizontal angle in sighting direction of the image pickup unit 7 is detected by the horizontal angle detector 12.

First, at the moment when the working is started, the image pickup unit 7 is directed in a direction toward the survey setting point which is to be set up first, and an angle to be detected by the horizontal angle detector 12 (angle in the sighting direction of the image pickup unit 7) is set as a reference angle.

Images are acquired by the image pickup unit 7, and staff images are extracted from the images. In this case, the image pickup unit 7 acquires video images or acquires still images at predetermined time interval as necessary for the tracking. In any of these cases, the data are stored as frame image data in the storage unit 16.

A staff image is extracted from the newest frame image, and a distance measurement, a sighting height (elevation angle), and a horizontal angle are obtained based on the staff image thus extracted. In this case, since the horizontal angle is a horizontal angle obtained from the image, the actual horizontal angle can be acquired by adding the angle detected by the horizontal angle detector 12 to the horizontal angle obtained.

When the setting of one survey setting point has been completed and the staff is moved, the image processing unit 17 extracts staff image for each of the frames, and the electronic level main unit 6 is rotated by the rotary driving unit 5 so that the extracted staff images are maintained at the center of the frame image or at least so that the staff image does not deviate from the frame image.

Based on the staff images extracted from each of the frame images, the measuring unit 19 measures the distance to the staff, the sighting height of the staff, and the horizontal angle, and the measurement results are transmitted to the mobile station device 21. The mobile station device 21 displays the measurement results on the mobile station display unit 25 in real time.

Drawing for working is displayed on the mobile station display unit 25. Because the drawing for working and the measurement results are displayed at the same time, the operator can find the present position with respect to the survey setting point, and the setting up of the survey setting point can be performed efficiently. Further, by carrying out the tracking, it is possible to set up the survey setting point in a range wider than the field angle of the image pickup unit 7, and because the drawing for working is displayed on the mobile station display unit 25, there is no need to assign an operator on the side of the electronic level 1, and this makes it possible to perform a one-man operation.

The invention claimed is:

1. A surveying system, comprising an electronic level and staff devices belonging to either one of two or more groups, wherein said staff device has staffs with bar codes of a different bar code pattern per each group, to which a staff belongs, and mobile station devices installed on said staffs,
wherein said mobile station device has a mobile station display unit to display working data and a mobile station communication unit for performing wireless communication to and from said electronic level,
wherein said electronic level has an image pickup unit adapted to acquire images within a range of working, a control device configured so as to extract staff images from the images, to identify as to which group said staff belongs based on the bar code pattern of the extracted staff image and to determine three-dimensional position of said staff based on said staff image, and a main communication unit adapted to transmit the three-dimensional position obtained to said mobile station device,
and wherein said mobile station device is configured so as to display the relation between the three-dimensional position of said staff as received and said working data on said mobile station display unit.

2. A surveying system according to claim 1, wherein three-dimensional positions of staffs at two or more geographical points are set by said staff device belonging to each of the groups, and a reference plane is formed for each of the groups respectively.

3. A surveying system according to claim 2, wherein said staff device has a mobile station tilt sensor for detecting the tilting of said staffs, and corrects the results of distance measurement and the horizontal angle with respect to said staffs based on the detection results of said mobile station tilt sensor.

4. A surveying system according to claim 1, wherein said image pickup unit acquires an image so that an object of working is included therein, said mobile station display unit displays by classifying as to which of the two or more groups said object of working belongs, and displays survey setting points to be set with respect to said object of working, wherein said electronic level measures the three-dimensional position of a staff for each of the groups with respect to said staff device, transmits said three-dimensional position to said corresponding mobile station device, and displays the relation between said staff and said survey setting point.

5. A surveying system according to claim 4, wherein said staff device has a mobile station tilt sensor for detecting the tilting of said staffs, and corrects the results of distance measurement and the horizontal angle with respect to said staffs based on the detection results of said mobile station tilt sensor.

6. A surveying system according to claim 1, wherein said staff device has a mobile station tilt sensor for detecting the tilting of said staffs, and corrects the results of distance measurement and the horizontal angle with respect to said staffs based on the detection results of said mobile station tilt sensor.

7. A surveying system according to claim 1, wherein said electronic level has a rotary driving unit and is able to rotate in horizontal direction by said rotary driving unit, wherein said image pickup unit acquires a frame image at every predetermined time, or acquires the frame images continuously, wherein said control device extracts a staff image for each frame image respectively, and rotates said electronic level by controlling said rotary driving unit so that the extracted image does not deviate from the frame image, and so as to follow said staffs.

8. A surveying system according to claim 1, wherein said image pickup unit is a total circumferential camera, and a total circumferential image is acquired by said image pickup unit.

\* \* \* \* \*